US008786874B2

(12) United States Patent
Tarumi

(10) Patent No.: US 8,786,874 B2
(45) Date of Patent: Jul. 22, 2014

(54) PROGRAM DELIVERY SERVER, PROGRAM DELIVERY METHOD AND COMPUTER-READABLE STORAGE MEDIUM FOR PRINTING AN IMAGE ON A RECORDING MEDIUM BASED ON INPUT DATA

(75) Inventor: Takeshi Tarumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 594 days.

(21) Appl. No.: 12/686,937

(22) Filed: Jan. 13, 2010

(65) Prior Publication Data

US 2010/0177349 A1 Jul. 15, 2010

(30) Foreign Application Priority Data

Jan. 14, 2009 (JP) ................................. 2009-006134

(51) Int. Cl.
*G06F 3/12* (2006.01)
(52) U.S. Cl.
USPC ........ 358/1.15; 358/1.13; 358/1.16; 709/203; 709/217; 709/219
(58) Field of Classification Search
CPC ... H04N 1/00; H04N 1/0097; H04N 1/00973; H04N 1/0029; H04N 1/00244; H04N 1/00474; H04N 2201/3202; G06F 3/1273; G06F 3/1285; G06F 3/1288
USPC ...................................... 358/1.15, 1.13, 1.16
See application file for complete search history.

(56) References Cited

U.S. PATENT DOCUMENTS

| 2006/0103866 | A1* | 5/2006 | Saka et al. | 358/1.13 |
| 2008/0278744 | A1* | 11/2008 | Marchesotti et al. | 358/1.15 |
| 2009/0073488 | A1* | 3/2009 | Nakatomi et al. | 358/1.15 |
| 2009/0122342 | A1* | 5/2009 | Kawano | 358/1.15 |
| 2009/0174893 | A1* | 7/2009 | Fujii et al. | 358/1.15 |

FOREIGN PATENT DOCUMENTS

JP  2003-316583  11/2003
JP  2007-042062  2/2007

* cited by examiner

*Primary Examiner* — Benny Q Tieu
*Assistant Examiner* — Juan M Guillermety
(74) *Attorney, Agent, or Firm* — Canon USA Inc. IP Division

(57) ABSTRACT

A program delivery server includes a collection unit configured to collect log information including actual use records of functions of an image forming apparatus, via a network, a selection unit configured to select at least one program, from among a plurality of control programs, using the log information that the collection unit collected, and a transmission unit configured to transmit a control program selected by the selection unit to the network.

8 Claims, 18 Drawing Sheets

FIG.13

```
PRINTER[BB]Action Log

...

[13:00:02] <Tab> @Copy (Simple)
[13:00:04] <Bottom> @AddMode Start
[13:00:05] <Bottom> @Parfectbind Start
[13:00:06] <Bottom> @back
[13:00:07] @Parfectbind End
[13:00:08] <Bottom> @Close
[13:00:09] @AddMode End
...
..
...
[13:02:11] <Tab> @BOX
[13:00:04] <Select> @06
[13:00:04] @BOX(06) Start
[13:00:07] <Select> @1:job (20080406192244)
[13:00:09] <Bottom> @EditMenu
[13:00:09] @EditMenu Start
[13:00:10] <Bottom> @Preview
[13:00:17] <Bottom> @Close
[13:00:18] @EditMenu End
[13:00:19] @BOX(06) End
...
```

1300, 1301, 1302

FIG.14
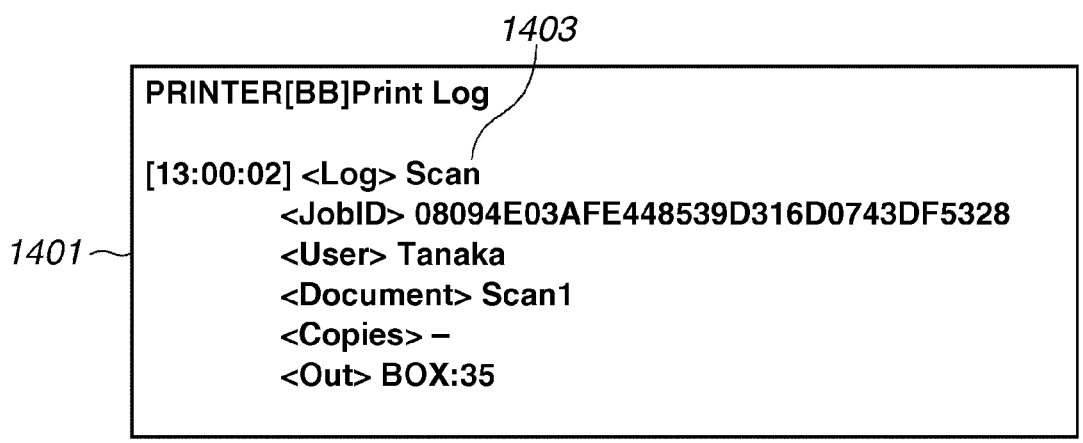
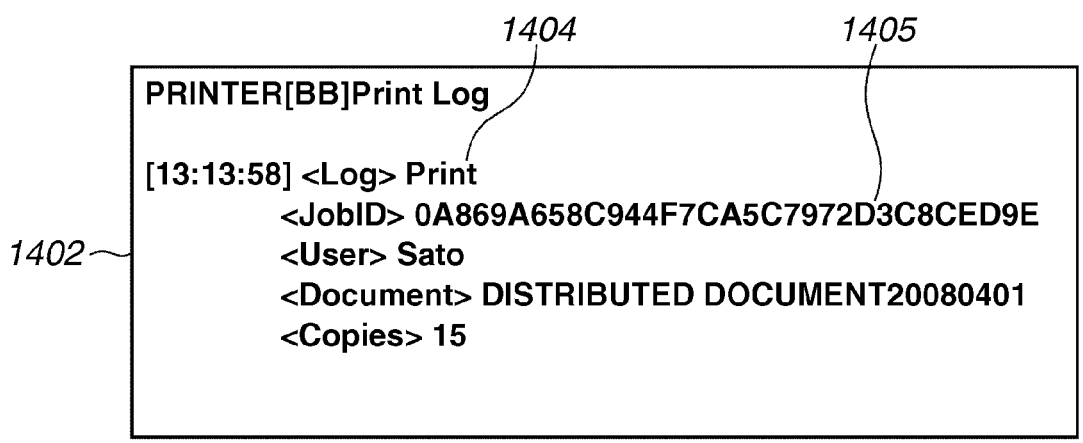

FIG.15

```
<?xml version="1.0" encoding="UTF-8"?><JDF ID="J1" JobPartID="ID0" Type="Combined" Types="LayoutPreparation
Imposition Interpreting ColorSpaceConversion Rendering DigitalPrinting" Activation="Active" Status="Ready"
<JobID> 0A869A658C944F7CA5C7972D3C8CED9E
<ResourcePool>
 <LayoutPreparationParams Class="Parameter" ID="IDLPP" Status="Available" Sides="OneSidedFront"/>
 <InterpretingParams Class="Parameter" ID="IDIP" Status="Available"/>
 <RenderingParams Class="Parameter" ID="IDRP" Status="Available"><ObjectResolution Resolution="600 600"/></
RenderingParams>
 <ColorantControl Class="Parameter" ID="IDCC" Status="Available" ProcessColorModel="DeviceCMYK"/>
 <DigitalPrintingParams Class="Parameter" ID="IDDPP" Status="Available" Collate="SheetSetAndJob"><gj:TrustPrint
NoOp="true"/><MediaRef rRef="RES_000"/></DigitalPrintingParams>
 <Component Class="Quantity" ID="IDC" ComponentType="FinalProduct" Status="Unavailable"/>
 <Media ID="RES_000" Class="Consumable" Status="Available" Dimension="595 842"><Location LocationName="AutoSelect"/
></Media><ColorSpaceConversionParams ID="RES_001" Class="Parameter" Status="Available"><FileSpec
ResourceUsage="FinalTargetDevice" UserFileName="PS Normal"/></ColorSpaceConversionParams></ResourcePool>
<ResourceLinkPool>
 <RunListLink rRef="IDRL" Usage="Input" CombinedProcessIndex="0 1"/>
 <LayoutPreparationParamsLink rRef="IDLPP" Usage="Input" CombinedProcessIndex="0"/>
 <ColorantControlLink Usage="Input" rRef="IDCC" CombinedProcessIndex="2"/>
 <InterpretingParamsLink rRef="IDIP" Usage="Input" CombinedProcessIndex="2"/>
 <RenderingParamsLink rRef="IDRP" Usage="Input" CombinedProcessIndex="4"/>
 <ColorantControlLink Usage="Input" rRef="IDCC" CombinedProcessIndex="5"/>
 <DigitalPrintingParamsLink rRef="IDDPP" Usage="Input" CombinedProcessIndex="5"/>
 <ComponentLink rRef="IDC" Usage="Output" CombinedProcessIndex="5" Amount="1"/>
 <MediaLink Usage="Input" rRef="RES_000" CombinedProcessIndex="5"/><ColorSpaceConversionParamsLink Usage="Input"
rRef="RES_001" CombinedProcessIndex="3"/></ResourceLinkPool>
<AuditPool>
 <Created AgentName="Canon imageWARE Print Job Manager" AgentVersion="1.0.0" TimeStamp="2007-01-
29T16:55:36+09:00"/>
</AuditPool>
```

| category | ITEM | 1 | 2 | 3 | 4 | 5 | ... |
|---|---|---|---|---|---|---|---|
| 0 | 000: PRINTER NAME | 02-01 | 01-01 | 02-01 | 03-01 | 03-02 | ... |
| 1 | 001: USER NAME | JIRO | TARO | JIRO | GORO | SIRO | ... |
| 1 | 001: TIME | 4/1 10:30 | 4/1 10:35 | 4/1 10:40 | 4/1 11:05 | 4/1 11:06 | ... |
| 1 | 003: JOB NAME | PROCEEDINGS | ORIGINAL DOCUMENT 1 | | MEETING MATERIAL | MEETING MATERIAL | ... |
| 1 | 004: NUMBER OF COPIES | 10 | | | 50 | 50 | ... |
| 2 | 005: DEVICE IMPRESSION | | ● | | | | ... |
| 2 | 006: COLOR PROCESSING | | ● | | | | ... |
| 2 | 007: FINISHING | | | | | | ... |
| 3 | 008: PREVIEW | ● | ● | | | | ... |
| 4 | 009: JOB STATUS | ● | | ● | | | ... |
| 5 | 010: SCAN | | | | | | ... |

| PROGRAM REGISTRATION TABLE | | | | |
|---|---|---|---|---|
| category | APRI1 | APRI2 | APRI3 | APRI4 |
| 0: PRINTER INFORMATION | 0 | 1 | 1 | 0 |
| 1: JOB INFORMATION | 1 | 2 | 0 | 0 |
| 2: JOB SETTING CHANGE | 3 | 0 | 0 | 0 |
| 3: PREVIEW | 2 | 0 | 1 | 0 |
| 4: JOB STATUS | 0 | 0 | 3 | 3 |
| 5: SCAN | 0 | 0 | 0 | 3 |
| PRESCRIBED NUMBER | 10 | 7 | 10 | 10 |

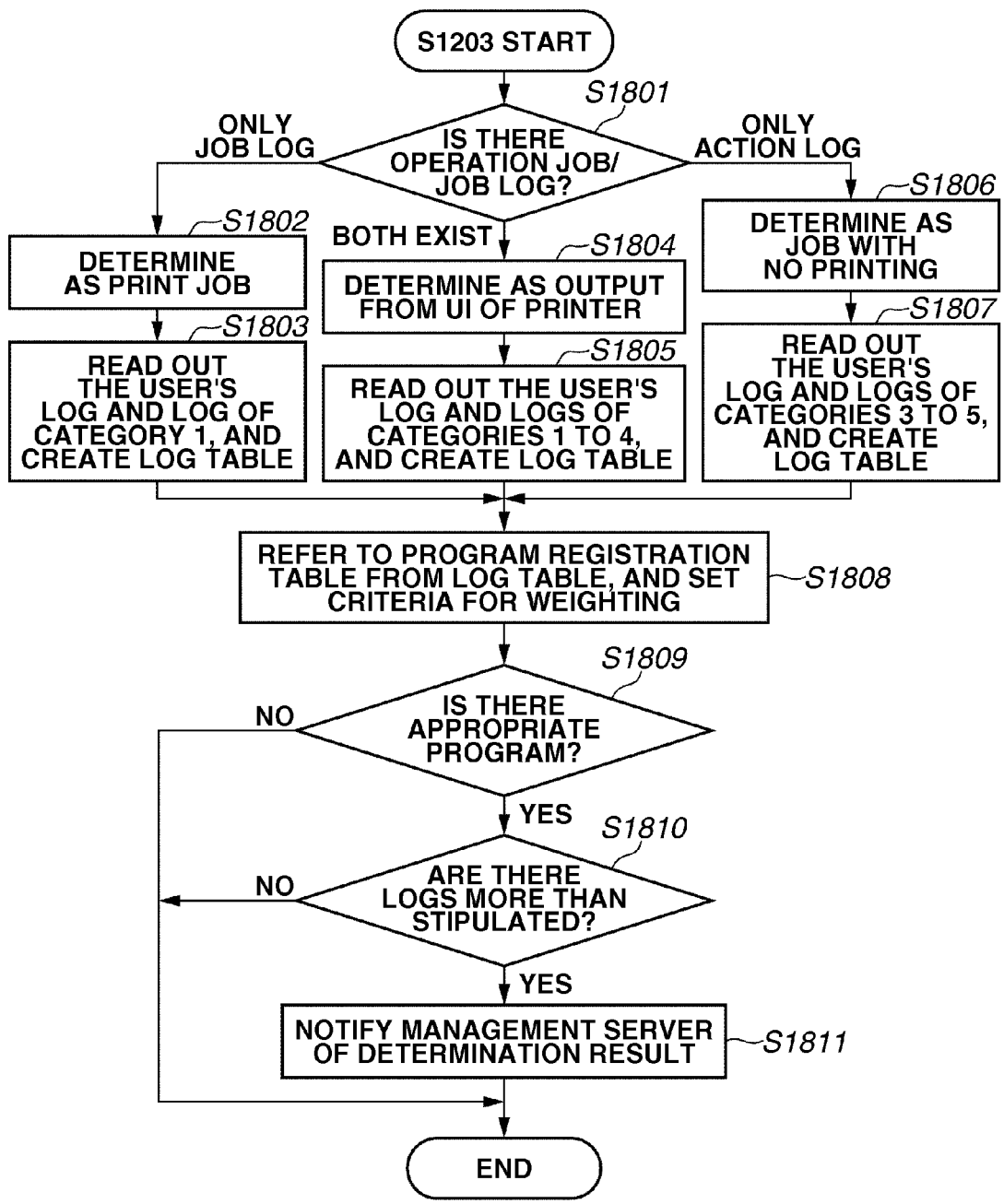

PROGRAM DELIVERY SERVER, PROGRAM DELIVERY METHOD AND COMPUTER-READABLE STORAGE MEDIUM FOR PRINTING AN IMAGE ON A RECORDING MEDIUM BASED ON INPUT DATA

BACKGROUND OF THE INVENTION

1. Field of the Invention

The present invention relates to a program delivery technique and the like.

2. Description of the Related Art

Conventionally, there has been a technique for collecting log information that server devices acquire from client apparatuses, in order to enhance execution efficiency of programs of the client apparatuses. As a typical technique, there is discussed a technique for storing collected log information and information of delivered programs, analyzing utilization characteristics in the client apparatuses, optimizing the delivered programs, and redelivering them (Refer to, for example, Japanese Patent Application Laid-Open No. 2003-316583).

Further, there is discussed a technology for collecting print history relating to attributes of image data of a print target, and displaying recommended applications on a UI, using a driver within a client (Refer to Japanese Patent Application Laid-Open No. 2007-042062).

SUMMARY OF THE INVENTION

According to an aspect of the present invention, a program delivery server includes a collection unit configured to collect log information including a track record of using functions of an image forming apparatus, via a network, a selection unit configured to select at least one program, from among a plurality of control programs, using the log information that the collection unit collected, and a transmission unit configured to transmit a control program selected by the selection unit to the network.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 13 illustrates an example of a printer operation history collected from the printer in the processing of step S1201 in FIG. 12.

FIG. 14 illustrates an example of a print history (job log) collected from the printer in the processing of step S1201 in FIG. 12.

FIG. 15 illustrates an example of print attributes collected by a collection unit using job identification (ID) as a key.

FIG. 16 illustrates an example of a table for log storage.

FIG. 17 illustrates an example of a program registration table in which features of the printer control program are registered.

FIG. 18 is a flowchart illustrating a procedure for a program appropriateness determination (step S1203 in FIG. 12).

DESCRIPTION OF THE EMBODIMENTS

Various exemplary embodiments, features, and aspects of the invention will be described in detail below with reference to the drawings.

Figure 1:
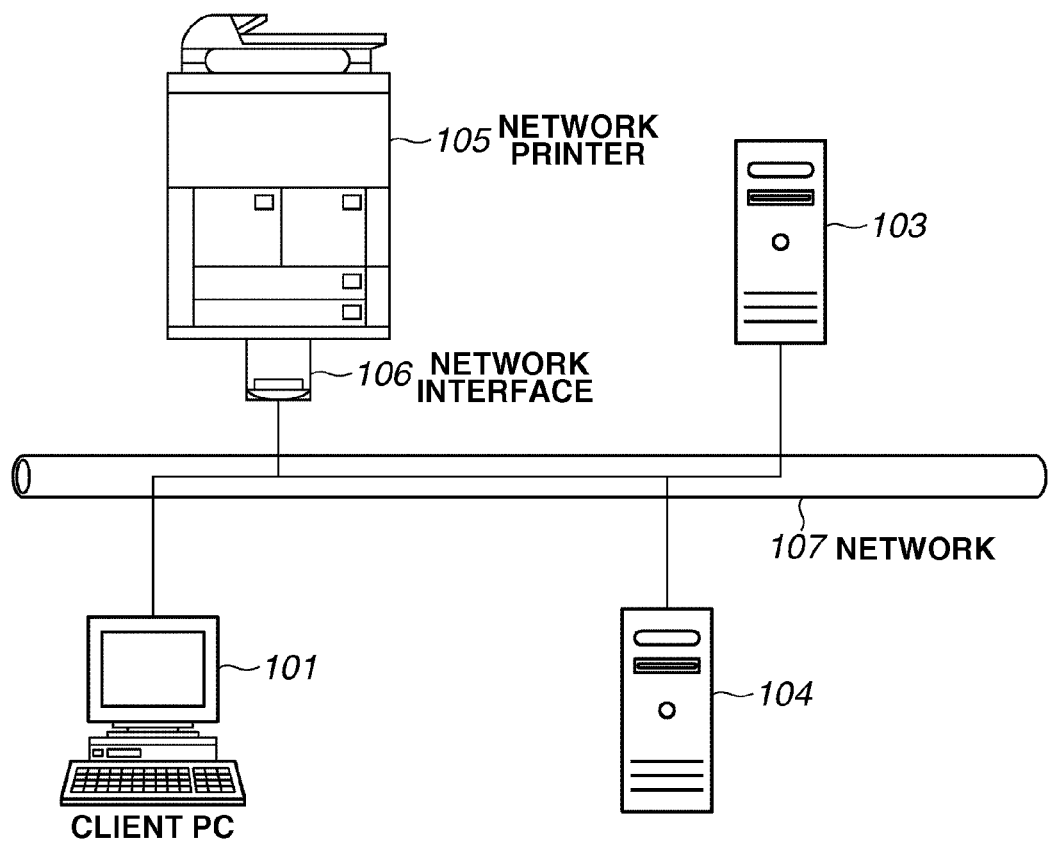
FIG. 1 illustrates a configuration of a print processing system according to an exemplary embodiment of the present invention.

FIG. 1 illustrates a configuration of a print processing system that is an example of an image forming system according to an exemplary embodiment of the present invention. In FIG. 1, a client apparatus 101 is a network computer that is mutually communicable with other apparatuses via a network 107. The client apparatus 101 is connected to the network 107 by a network cable such as Ethernet, and can execute various programs such as application programs and the like. Further, a printer driver is mounted that has a function of converting print data into printer language corresponding to a printer 105 described below.

Further, the printer driver has a function of transferring the print data that has been converted into the corresponding printer language, to the printer 105. In FIG. 1, only one set of the client apparatus 101 is illustrated, but a plurality of client apparatuses 101 can be also connected to the network 107. In this case, functions possessed by respective client apparatuses 101, may differ from one another.

The printer 105 is a network printer serving as an image forming apparatus, and it is connected with the network 107 via a network interface card 106. The printer 105 analyzes a print job containing print data transmitted from the client apparatus 101, and converts the print data into dot image one page after another to print them. In FIG. 1, only one set of the printer 105 is illustrated, but similarly to the client apparatus 101, a plurality of printers 105 may be connected to the network 107. Further, functions of respective printers 105 may differ from one another.

The program delivery server 103, which is a kind of server computers, collects print history information and the like performed by the printer 105 via the network 107. The program delivery server 103 refers to collected information, and delivers control programs optimal for executing processing contained in the information. Further, a management server 104, which is also a kind of the server computers, manages user information in the client apparatus 101 and the printer 105 via the network 107. In FIG. 1, although the management server 104 is separately configured from the program delivery server 103, both functions may be achieved by the same server.

Figure 2:
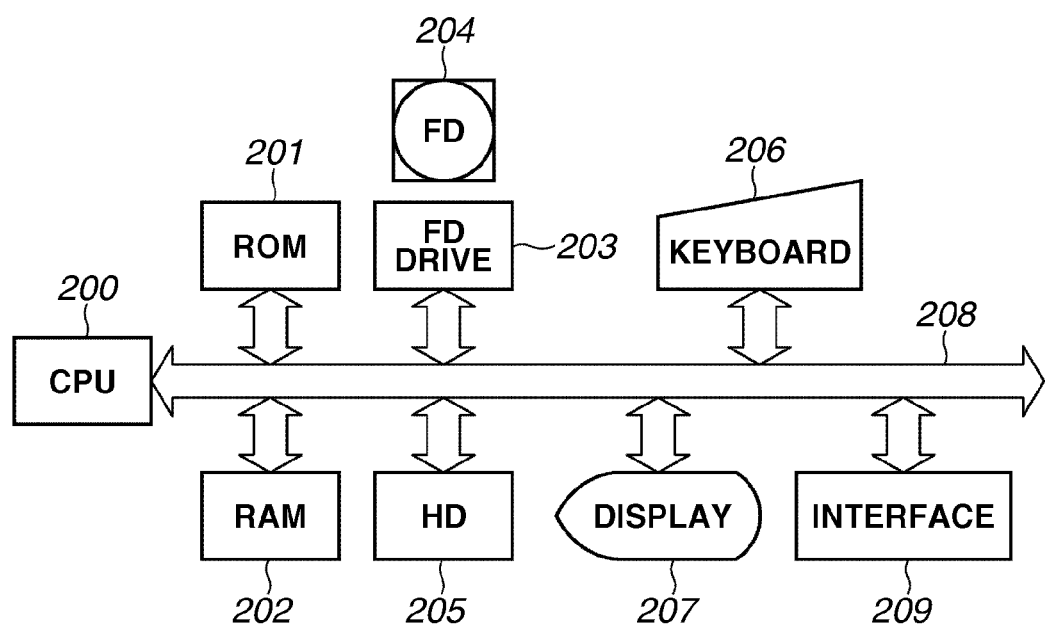
FIG. 2 is a block diagram illustrating a hardware construction of a client apparatus, a program delivery server and a management server.

Next, the hardware construction of the client apparatus 101, the program delivery server 103, and the management server 104 will be described. FIG. 2 is a block diagram illustrating the hardware construction of the client apparatus 101, the program delivery server 103, and the management server 104. The client apparatus 101, the program delivery server 103, and the management server 104 include a central processing unit (CPU) 200, a ROM 201, and a random-access memory (RAM) 202. Further, the client apparatus 101, the program delivery server 103, and the management server 104 include a floppy disk (FD) drive 203, a hard disk (HD) 205, a keyboard 206, a display 207, and an interface 209. These respective functional units are connected via a system bus 108 that governs a flow of data inside the apparatus.

A central processing unit (CPU) 200 governs a control of the entire apparatus. For example, the CPU 200 executes an application program, a printer driver program, an operating system (OS) stored in the HD 205, and a printer control program and a program delivery program and the like according to the present exemplary embodiment. Further, necessary information for execution of programs, files, etc. are temporarily stored in the RAM 202.

The ROM 201 is a storage unit, which stores programs such as a basic input/output (I/O) program, font data, data for template and other various data used when document processing is performed. A program for executing the program delivery according to the present exemplary embodiment is also stored in the ROM 201. The RAM 202 is a temporary storage unit, which functions as a main memory, a working area and the like of the CPU 200.

The FD drive 203 is a storage medium reading unit, which can load a program and the like stored in a floppy disk (FD) 204 as a storage medium. A storage medium is not limited to FD, but also a compact disc read-only memory (CD-ROM), a CD recordable (CDR), a CD rewritable (CDRW), a personal computer (PC) card, a digital versatile disk (DVD), an integrated circuit (IC) memory card, a magneto-optical disk (MO), a memory stick, or the like can be used.

The HD 205 is an external storage unit functioning as a mass-storage memory, and stores an application program, a printer driver program, an OS, a printer control program, associated program, etc. Furthermore, a spooler serving as a spool unit is secured here. The spool unit refers to a client spooler when it is in the client apparatus 101, and refers to a server spooler when it is in the program delivery server 103. Further, in the program delivery server 103, a table for storing job information received from the client apparatus 101, and performing an order control is stored in the HD 205 after it has been created.

A keyboard 206 is an instruction and input unit, via which a user inputs to the client apparatus 101, and an operator or an administrator inputs to each server, a control command for the printer 105 and the like.

The display 207 is a display unit, for displaying a command that has been input from the keyboard 206, and a state of the printer 105, and so forth. The interface 209 is an input and output unit, for exchanging data with external devices while being connected to the network.

The hardware construction of the client apparatus 101, the program delivery server 103, and the management server 104 illustrated herein is an example thereof. Thus, it is not limited to the configuration example in FIG. 2. For example, a storage destination of data and programs can be selected from a ROM, a RAM, an HD, or the like depending on its features.

Next, a memory map of the RAM 202 to be used in the client apparatus 101, the program delivery server 103, and the management server 104 will be described. This is a memory map in a state in which a printer control program to be loaded from the FD 204 has been loaded into the RAM 202, and has become executable. In the present exemplary embodiment, it is assumed as an example that the printer control program and associated data are loaded from the FD 204 directly to the RAM 202 and executed. In a case where the printer control program has been already installed in the HD 205, each time the printer control program is operated, the printer control program may be loaded from the HD 205 to the RAM 202.

Further, a medium for storing the printer control program may be a CD-ROM, a CDR, a PC card, a DVD, an integrated circuit (IC) memory card, in addition to a FD. Furthermore, by storing the printer control program in the ROM 201, the ROM 201 can be configured to form a part of the memory map, and thus the printer control program can be directly executed by the CPU 200. Also, software that achieves an equivalent function to that of each functional unit described above, can be configured as a substitute for a hardware device.

The printer control program as will be described below includes programs that execute controls for issuing an instruction for a print destination change of a print job, and an instruction of print order change, in the client apparatus 101.

Figure 3:
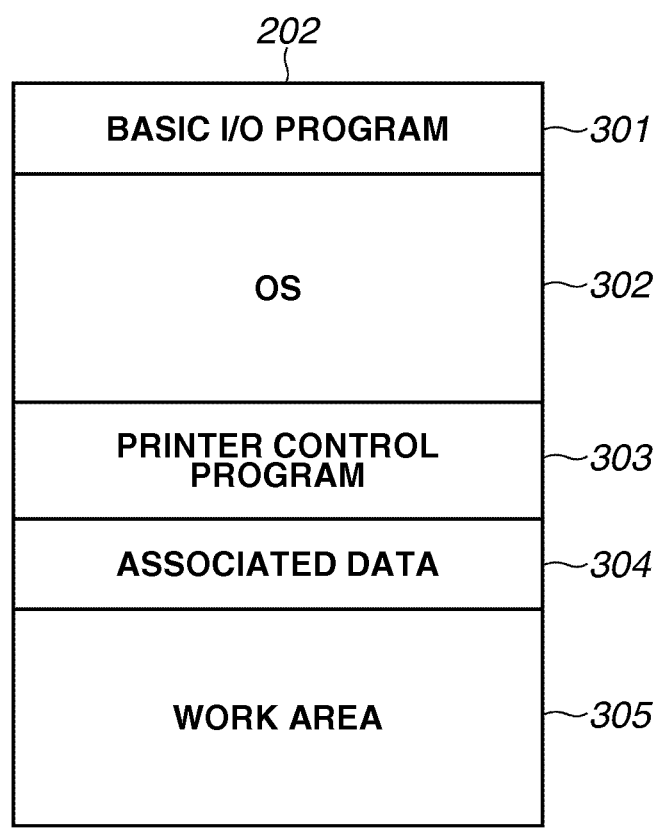
FIG. 3 illustrates an example of a memory map of a read-only memory (ROM).

FIG. 3 illustrates an example of the memory map of the RAM 202 illustrated in FIG. 2. The RAM 202 is composed of a basic I/O program area 301, an operating system (OS) area 302, a printer control program area 303, associated data area 304, and a working area region 305.

The basic I/O program area 301 is an area in which a program having an initial program loading (IPL) function or the like for starting an operation of OS is contained. The OS is loaded from the HD 205 into the RAM 202, when power of the apparatus is turned on. The OS area 302 is used to store the operating system. The printer control program area 303 is used to store the printer control program. The associated data area 304 is used to store data associated with the printer control. The work area region 305 is used as the working area, when the CPU 200 executes the printer control program.

Figure 4:
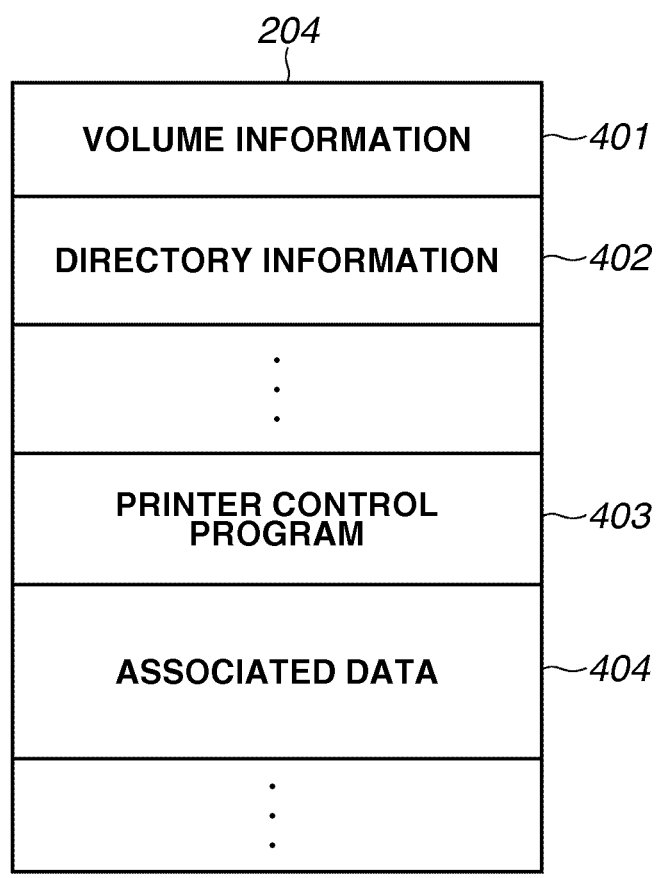
FIG. 4 illustrates an example of a memory map of a floppy disk (FD).

Next, the memory map of the FD 204 will be described. FIG. 4 illustrates an example of the memory map of the FD 204 illustrated in FIG. 2. The FD 204 is composed of a volume information area 401, a directory information area 402, a printer control program area 403, and an associated data area 404.

The volume information area 401 is used to store volume information indicating information of data. The directory information area 402 is used to store directory information. The printer control program area 403 is used to store the printer control program. The printer control program is used for achieving a printer control method described below, and in the present exemplary embodiment, both the client apparatus and the server take the similar configuration together. The associated data area 404 is used to store data associated with the printer control.

Figure 5:
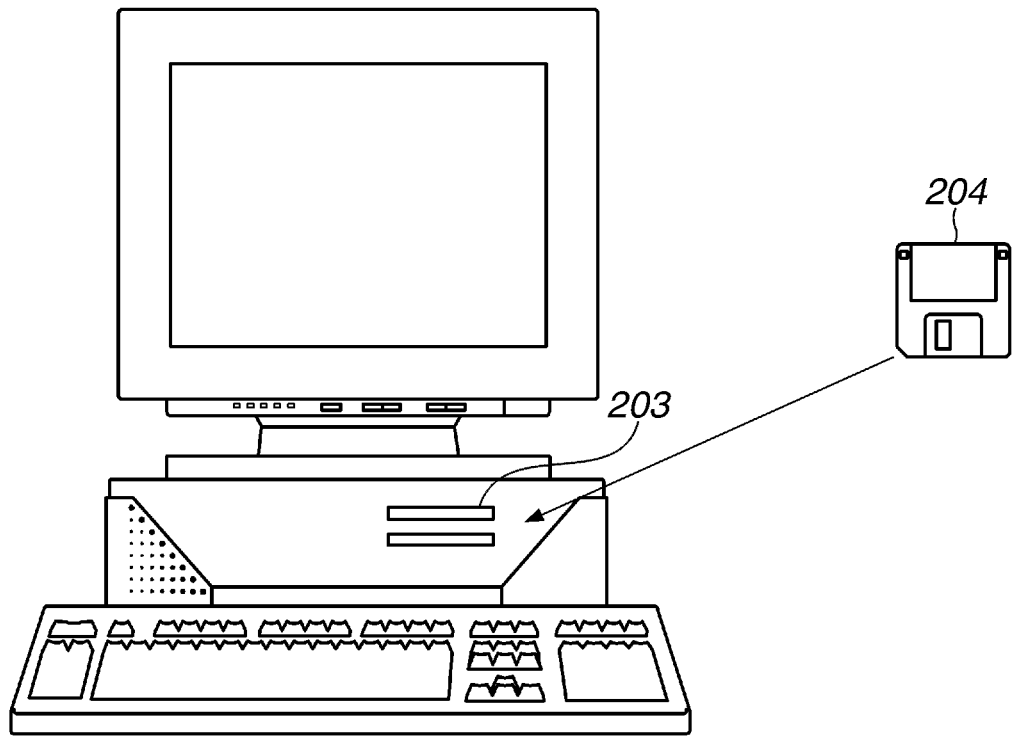
FIG. 5 is an appearance view of the client apparatus, the program delivery server and the management server.

FIG. 5 is an appearance view of the client apparatus 101, the program delivery server 103, and the management server 104 to be used in the present exemplary embodiment. The FD 204 is, when used, inserted into the FD drive 203 provided in each apparatus. In the FD 204, the above-described printer control program and the associated data and the like are stored.

Figure 6:
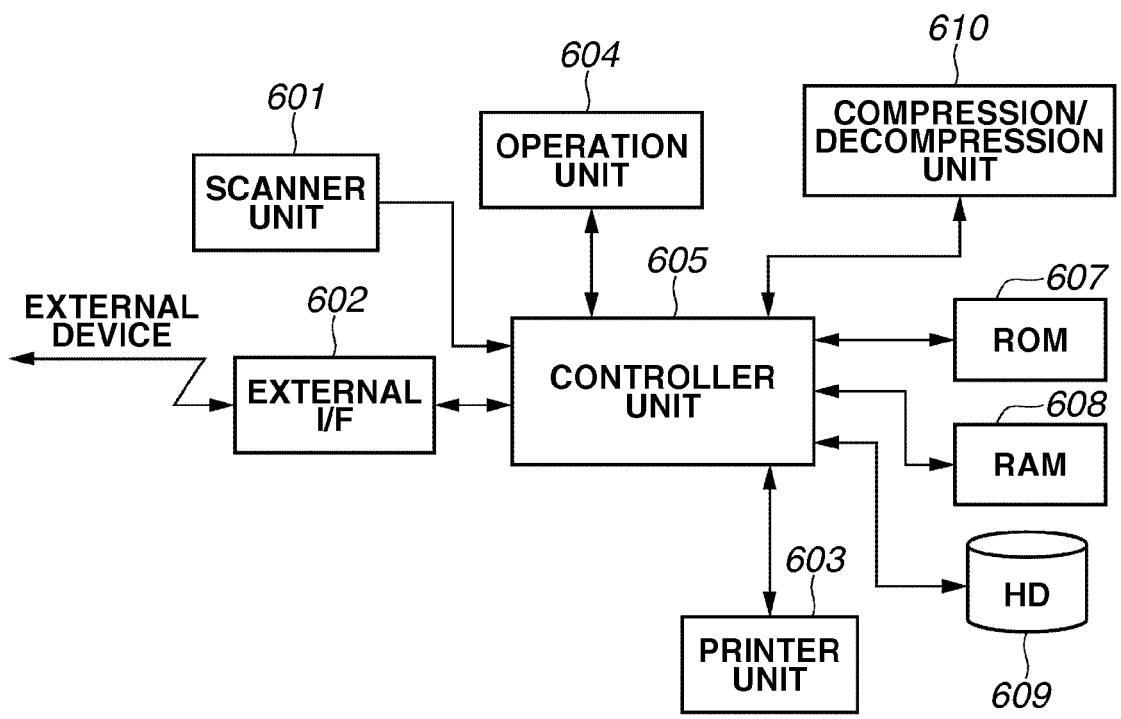
FIG. 6 is a block diagram illustrating a hardware construction of a printer in an image processing unit.

Next, a hardware construction of an image processing unit in the printer 105 will be described. FIG. 6 is a block diagram illustrating the hardware construction of the image processing unit in the printer 105.

The printer 105 is provided with a scanner unit 601 that reads out an original image, and performs image processing of the readout image data. Further, the printer 105 is provided with a printer unit 603 that executes print processing of job data to be printed on a print medium. A copy function for printing job data received by the scanner unit 601 is performed by the printer unit 603.

Further, the printer 105 is provided with an external interface (I/F) unit 602 that transmits and receives image data and the like to and from facsimiles, network connection devices, external dedicated apparatuses, via the network. The printer 105 performs with the printer unit 603 a printing function for printing job data from the client apparatus 101 received via the external I/F unit 602. The printer 105 is a multifunction peripheral (MFL) type print control apparatus (also called an image forming apparatus) performing such a plurality of functions.

The printer 105 is provided with a hard disk (HD) 609 capable of storing data of a plurality of jobs to be processed inside its own apparatus. The HD 609 can store image data of a plurality of jobs to be printed, received from the scanner unit 601 and the external I/F unit 602. The HD 609 can retain a plurality of pieces of data such as print data of the jobs to be processed. Further, the printer 105 is provided with an operation unit 604 for inputting various commands. The operation unit 604 includes a display unit for displaying various pieces of information.

The printer 105 is provided with a controller unit (also referred to as control unit, or CPU) 605 that performs a control of the entire apparatus by totally controlling processing and operations of various units. Further, the printer 105 is provided with a ROM 607 as a read-only memory. In the ROM 607, various control programs required in the present exemplary embodiment, including programs of boot sequence, font information and so forth are stored. Also, in the ROM 607, a display control program for causing the display unit of the operation unit 604 to display various UI screens, including the user interface screen (hereinafter referred to as UI screen) is stored. Further, a program for executing operations to translate page description language (PDL) code data received from external devices via the external I/F 602, and to expand it into raster image data (bitmap image data) is also stored in the ROM 607. The controller unit 605 reads out and executes a program stored in the ROM 607, thereby causing the printer 105 to execute various operations described below.

The printer 105 is provided with a RAM 608 as a readable and writable memory. The RAM 608 stores image data, various programs and setting information sent via a memory controller (not shown) from the scanner unit 601 or the external I/F 602.

The printer 105 is provided with a compression/decompression unit 610 that performs compression/decompression operations on image data stored in the RAM 608 and the HD 609 by various compression schemes such as Joint Bi-level Image Experts Group (JBIG) and Joint Photographic Experts Group (JPEG) and the like. The image data compressed by the compression/decompression unit 610 is stored in the HD 609.

The printer 105 may be used so long as various controls described below are executable. It may bean image forming apparatus that can perform color printing, or an image forming apparatus that can perform only monochrome printing.

Figure 7:
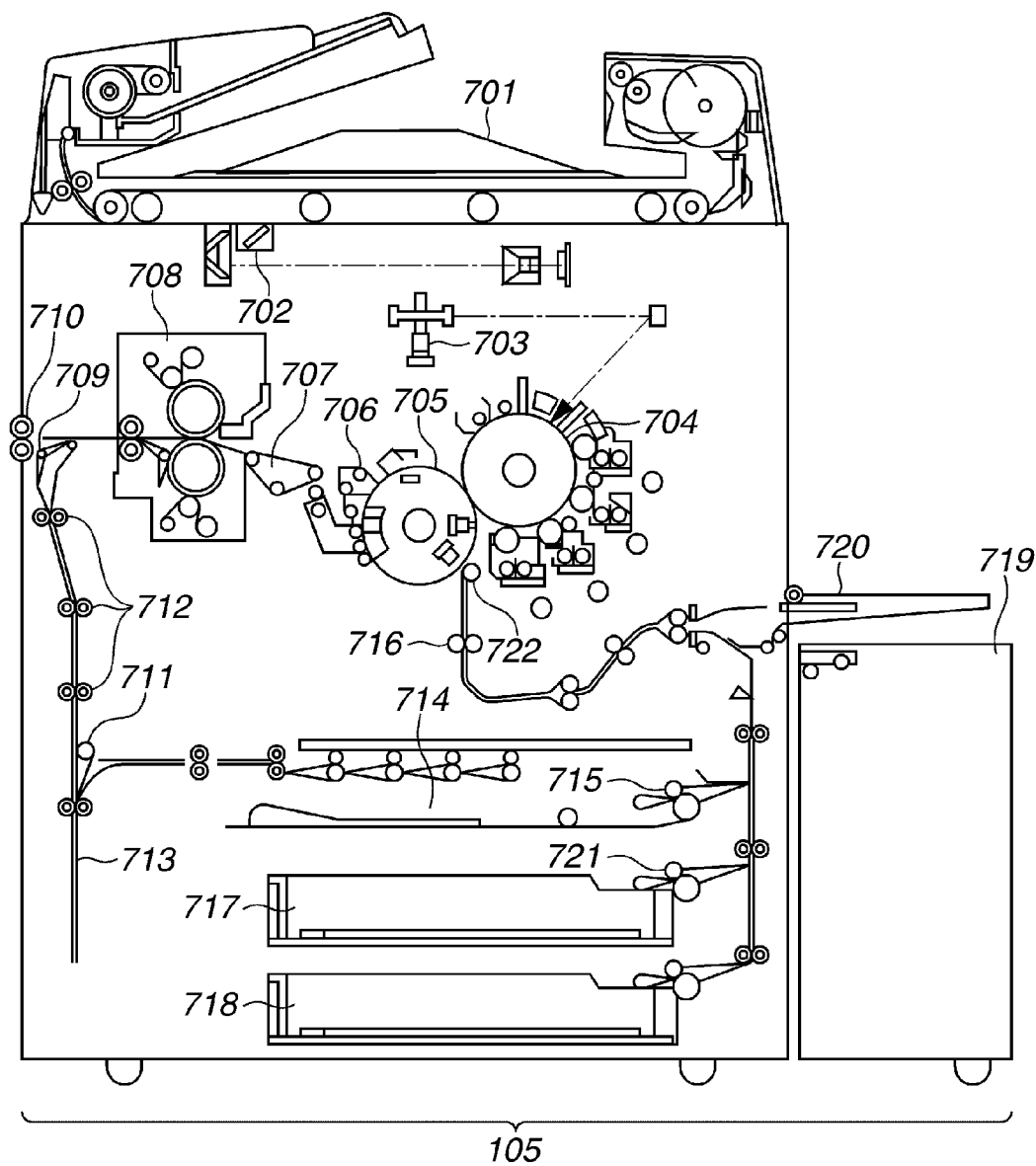
FIG. 7 is a longitudinal sectional view illustrating an internal configuration of the printer.

Next, an internal configuration of the printer 105 will be described. FIG. 7 is a longitudinal sectional view illustrating an internal configuration of the printer 105. In this case, a configuration of a 1D type color multifunction peripheral (MFP) will be described. A 4D type color MFP, and a monochrome MFP can be also used in a system in the present exemplary embodiment, but descriptions thereof will be omitted. Hereinbelow, a paper handling operation for supplying sheets on which a print processing job has been performed, from the inside of the printer unit to the inside of a sheet processing apparatus, will be mainly described. Further, processing after printing is performed will be omitted for the sake of convenience of description.

In FIG. 7, an automatic original feed apparatus (AOF) 701 corresponds to the scanner unit 601 in FIG. 6, and a portion from a scanner 702 through an attraction roller 722 corresponds to a mechanical configuration of the printer unit 603 in FIG. 6.

In FIG. 7, the automatic original feed apparatus 701 sequentially separates an original of the first page from an original bundle set on a mounting surface of a tray in page order and feeds the original onto an original positioning glass plate for performing original scanning by a scanner 702. The scanner 702 reads out an image of the original fed onto the original positioning glass plate, and coverts the image into image data through a charge-coupled device (CCD). A rotational polygon mirror or the like 703 causes a light beam such as a laser light which has been modulated in accordance with the image data, to enter, and irradiates a photosensitive drum 704 with the reflected scanning light via a reflection mirror. A latent image formed on the photosensitive drum 704 by the laser light is developed by toner and turned into a toner image. Then the toner image is transferred onto a sheet material attached to a transfer drum 705. The series of this image forming process is sequentially executed for toners of yellow (Y), magenta (M), cyan (C), and black (K), thus forming a full-color image. After the image forming process is performed four times, the sheet material on the transfer drum 705 on which the full-color image has been formed, is separated by a separation nail 706, and conveyed to a fixing device 708 by a pre-fixing conveyance device 707.

The fixing device 708 is configured of a combination of rollers and belts, and provided with a built-in heat source such as a halogen heater. The fixing device 708 fuses and fixes the toners on the sheet material on which the toner images are transferred by way of heat and pressure. A sheet discharge flapper 709 can swing about a swing axis to regulate a conveyance direction for the sheet material. When the sheet discharge flapper 709 is swung in the clockwise direction in the drawing, the sheet material is conveyed straight to be discharged to the outside of the apparatus by sheet discharge rollers 710. On the other hand, when images are formed on both sides of the sheet material, the sheet discharge flapper 709 is swung in the counterclockwise direction in the drawing. The conveying direction of the sheet material is changed in the downward direction and conveyed to a two-sided conveyance unit. The two-sided conveyance unit is configured of a reversing flapper 711, reversing rollers 712, a reversing guide 713, and a two-sided tray 714.

The reversing flapper 711 is constructed to be able to swing about a swing axis and to regulate a conveyance direction of the sheet material. When a two-sided print job is processed, the reversing flapper 711 is swung in a counterclockwise direction in the drawing, and controlled so that the sheet, of which the first surface is printed, be conveyed to the reversing guide 713 by the reversing rollers 712. While a trailing edge of the sheet material is nipped by the reversing rollers 712, the reversing rollers 712 are temporarily stopped, and subsequently, the reversing flapper 711 is swung in a clockwise direction in the drawing. Furthermore, the reversing rollers 712 are rotated in an opposite direction and the sheet is switchbacked and conveyed. While the trailing edge and a leading edge of the sheet are switched, the reversing flapper 711 is controlled so that the sheet is guided to the two-sided tray 714.

In the two-sided tray 714, the sheet material is temporarily loaded, and thereafter, the sheet material is conveyed back to registration rollers 716 by refeeding rollers 715. At this time, the sheet material is conveyed while a surface on a reverse side of the image-transferred first surface faces the photosensitive drum. Then, the second surface image is formed on the second surface of the sheet similarly to the above-described process. Then, the images are formed on both surfaces of the sheet material. The sheet material is subjected to the fixation and discharged from the inside to the outside of the print apparatus by the sheet discharge rollers 710. A control unit 605 (refers to FIG. 6) enables the printer 105 to perform two-sided print, by executing such a series of two-sided print sequences as described above. The two-sided print of job data for two-sided print target is performed on each surface of the first surface and the second surface of the sheet.

A sheet feed and conveyance unit includes sheet cassettes 717 and 718 (for example, each can contain 500 pieces of sheets) as a sheet feeding unit that contains sheets required for print processing, a paper deck 719 (which, for example, can contain 5000 pieces of sheets), and a manual feed tray 720. Further, sheet feed and conveyance unit includes the sheet feed rollers 721, and the registration rollers 716 as units that feed sheets contained in these sheet feeding units. The sheet cassettes 717 and 718, the paper deck 719 are constructed such that sheets of various sizes and various materials can be differentiated and set in each sheet feeding unit.

The manual feed tray 720 is also constructed such that various printing media including special sheets such as an overhead projector (OHP) sheet can be set. The sheet feed rollers 721 are respectively arranged in the sheet cassettes 717 and 718, the paper deck 719, and the manual feed tray 720, and the sheet can be continuously fed one by one. More specifically, the loaded sheet materials are sequentially fed by pickup rollers. Double feed is prevented by separation rollers which is provided facing the sheet feed rollers 721. Thus, the sheet material is conveyed to conveyance guides one by one. At this time, a driving force for a rotation in a direction opposite to the conveyance direction is input to the separation rollers through a torque limiter not illustrated in the drawing. When only one sheet enters a nip portion formed between the separation rollers and the sheet feed rollers, the separation rollers are rotated in the conveyance direction while following the sheet material.

On the other hand, in a case where the double feed occurs, the separation rollers are rotated in the direction opposite to the conveyance direction to fetch the double-fed sheet material. Thus, only one top-most sheet is conveyed. The conveyed sheet material is guided to a part between the conveyance guides, and conveyed to the registration rollers 716 by a plurality of conveyance roller sets. At this time, the registration rollers 716 are stopped. The leading edge of the sheet material abuts on a nip part formed by the registration rollers 716. Then, the sheet material forms a loop and a skew (oblique movement) is corrected.

After that, in an image forming unit, in accordance with timing of the toner image formed on the photosensitive drum 704, the rotation of the registration rollers 716 is started to convey the sheet material. The sheet material conveyed by the registration rollers 716 is electrostatically attracted to a surface of the transfer drum 705 by an attraction roller 722. The sheet material which is discharged from the fixing device 708 is introduced into a sheet conveyance path inside a sheet processing apparatus by the sheet discharge rollers 710.

The control unit 605 illustrated in FIG. 6 causes the printer unit 603 to execute a print job in a printing process as described above. More specifically, the control unit 605 causes the printer unit 603 to execute print processing of print job data by the above-described method. In this case, the job received from a data generation source is stored into the HD 609 according to a print execution request received from a user via a UI unit. For example, in a case where a print execution request is received from the operation unit 604, a data generation source of the job is the scanner unit 601. Further, in a case of a print execution request received from a host computer, the data generation source of the job is the host computer.

Further, the control unit 605 causes the HD 609 to store print data of a process target job, in order from the first page, reads out the print data of the job from the HD 609 in order from the first page, and forms an image of the print data on a sheet. In addition, the control unit 605 supplies sheets to be printed in order from the first page, with an imaged surface facing downward, to the sheet conveyance path inside the sheet processing apparatus. For this reason, immediately before introducing the sheets to the inside of the sheet processing apparatus by the sheet discharge rollers 710, the control unit 605 causes units 709, 712 and the like to execute switchback operation to reverse the sheets conveyed from the fixing unit 708. In this way, a paper handling control for handling the first page processing is also performed by the control unit 605.

Figure 8:
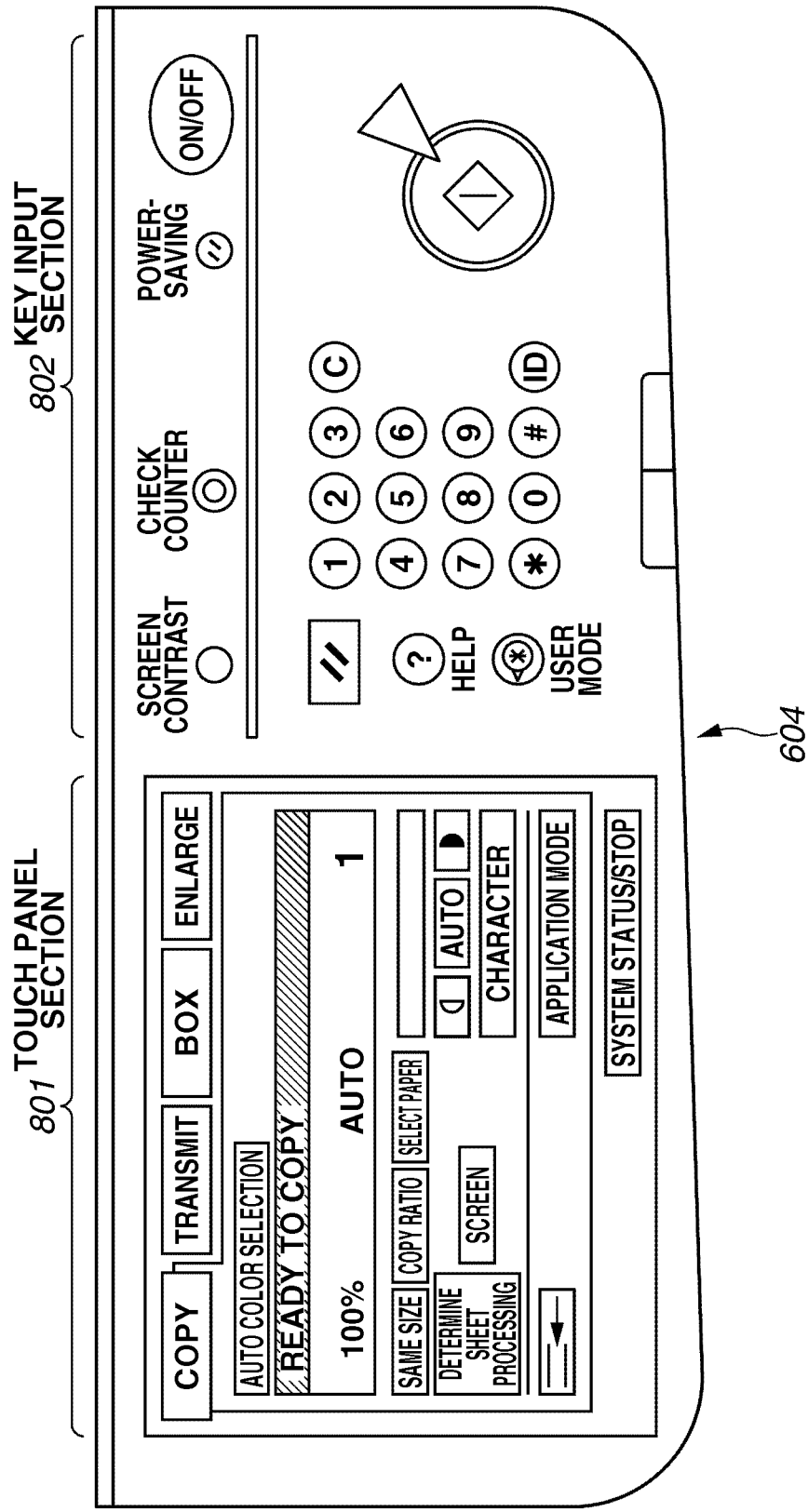
FIG. 8 is a front view of an operation unit.

Next, the operation unit 604 serving as a user interface (UI) provided in the printer 105 will be described. FIG. 8 is a front view of the operation unit 604. The operation unit 604 includes the touch panel section 801 serving as a display unit that can receive user operation by a software key (display key), and a key input section 802 that can receive a user operation by a hardware key.

Figure 9:
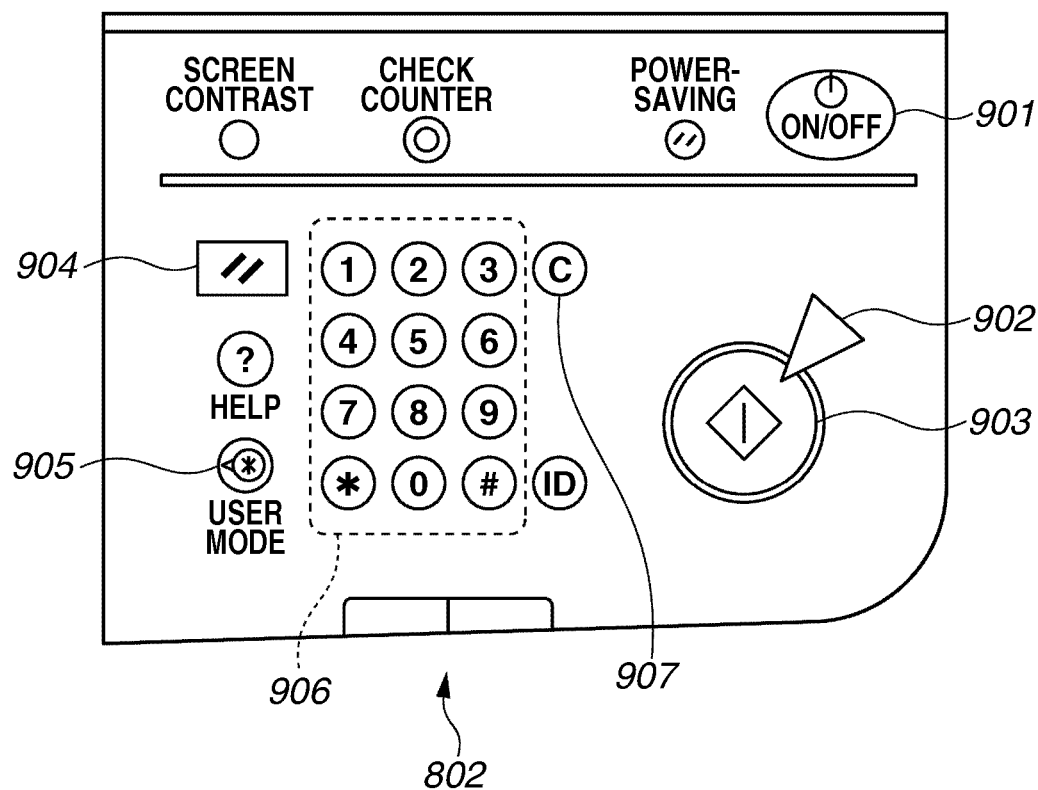
FIG. 9 is an enlarged view of a key input section.

FIG. 9 is an enlarged view of the key input section 802. The key input section 802 includes a power supply switch 901 for an operation unit, as illustrated in FIG. 9. When the operation unit power supply switch 901 is pressed, switching between a standby mode (normal operation state) and a sleep mode is performed. In the sleep mode, the program is stopped in an interruption queue state waiting for the network print, the facsimile, and the like, and the power consumption is suppressed. The switching is selectively controlled by the control unit 605. Further, the control unit 605 receives a manipulation of the power supply switch 901 for the operation unit performed by the user, when a main power supply switch (not shown) adapted to supply power to the entire system is in an ON state.

A start key 903 is a key for receiving from a user an instruction for causing the printer 105 to start job processing, such as copy operation, send operation, and the like of a process target job. A stop key 902 is a key for receiving from the user an instruction for causing the printer 105 to interrupt processing of a received job. A ten-key 906 is a key for executing various settings of numerals by the user. A clear key 907 is a key for canceling various parameters such as the numerals set by the user via the key 906. A reset key 904 is a key for invalidating all various settings performed on a process target job by the user, and for receiving from the user an instruction for returning the setting values to the default state. A user mode key 905 is a key for shifting the screen to the system setting screen for every user.

Figure 10:
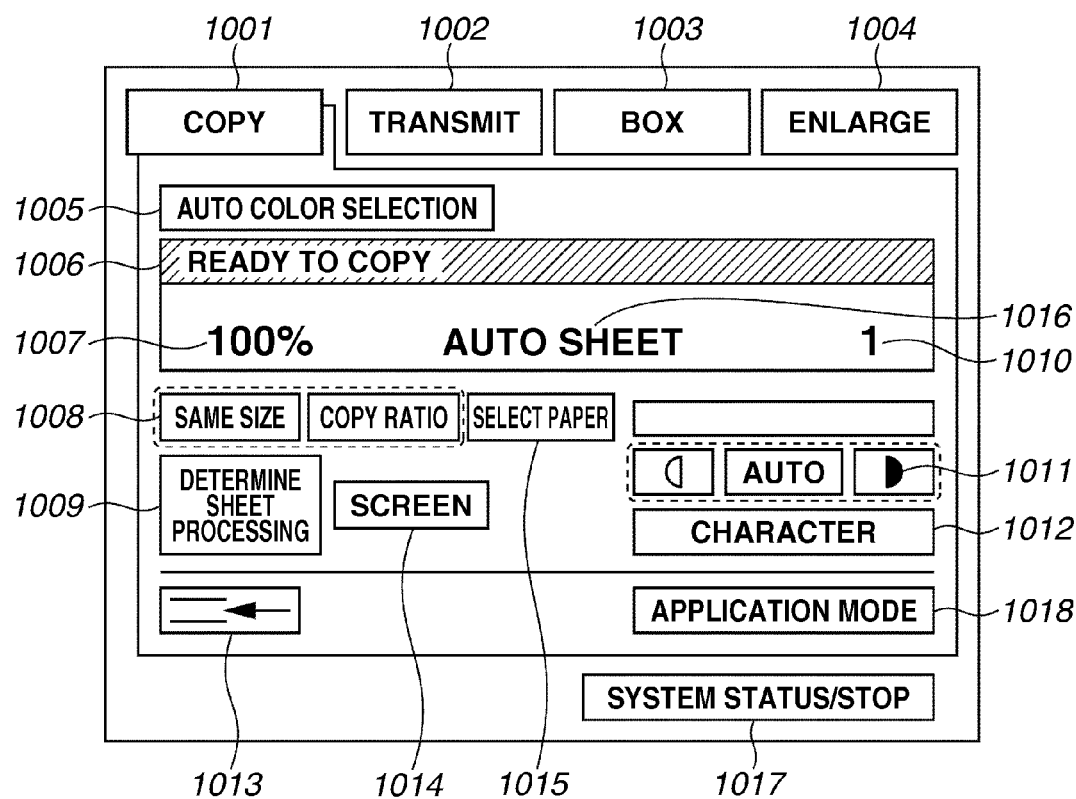
FIG. 10 is an enlarged view of a touch panel section.

FIG. 10 is an enlarged view of a touch panel section 801. The touch panel section 801 is configured of a touch panel display including a liquid crystal display (LCD: liquid crystal display unit) and a transparent electrode affixed on the liquid crystal display unit. The touch panel section 801 combines both a function for receiving various settings from the user, and a function for presenting information to the user. For example, upon detecting the user's pressing an area corresponding to a display key in a valid display state on the LCD, the control unit 605 performs control to display an operation screen in response to the key manipulation on the touch panel section 801, in accordance with a display control program stored in advance in the ROM 607. FIG. 10 illustrates an example of an initial screen to be displayed by the touch panel section 801, while the printer 105 is in a standby mode (state where there are no jobs to be processed).

In FIG. 10, when a copy tab 1001 on the touch panel section 801 is pressed by a user, the control unit 605 displays the operation screen of a copy function, with which the printer 105 is provided, on the touch panel section 801. When a send tab 1002 is pressed by the user, the control unit 605 displays an operation screen of data send function such as a facsimile or an E-mail send, with which the printer 105 is provided, on the touch panel section 801. When a box tab 1003 is pressed by the user, the control unit 605 displays an operation screen of a box function, with which the printer 105 is provided, on the touch panel section 801.

A box function refers to a function for using a plurality of data storage boxes (hereinafter, referred to as box) which is in advance virtually provided in the HD 609. The data storage boxes can be used in a discriminated manner for each user. By this function, the control unit 605, for example, allows the user to select a box that the user wants out of a plurality of boxes via the user interface unit, and performs controls to receive desired operation from the user. For example, the control unit 605 responds to an instruction from the user that is input via the operation unit 604, and controls the box in the HD 609 selected by the user, so that text data of a job received from the scanner 601 can be stored.

Further, the control unit 605 enables storage of text data and the like of a job from an external device received via the external I/F unit 602 in a box designated by the user, in accordance with a user instruction of the external device designated via a user interface unit of the external device. Further, the control unit 605 causes the printer unit 603 to print the data of the job stored in the box, in an output form that the user desires, in accordance with a user instruction from the operation unit 604. Further, the control unit 605 controls the external I/F unit 602 to send a printed output to an external device that the user desires.

In order that various box operations can be executed by a user in this way, the control unit 605 performs control, when a box tab 1003 is pressed, to display an operation screen of the box function on the touch panel section 801. Further, the control unit 605, when an expansion tab 1004 of the touch panel section 801 is pressed by a user, displays a screen for setting an expansion function such as scanner setting on the touch panel section 801. When a system monitor key 1017 is pressed by a user, the control unit 605 causes a display screen for notifying the user of state and status of MFP to be displayed on the touch panel section 801.

A color selection setting key 1005 is a display key for a user to select a color copy, a monochrome copy, or an auto selection in advance. A magnification ratio setting key 1008 is a key for displaying on the touch panel section 801 a setting screen that enables the user to execute the magnification ratio setting such as 1:1, enlargement, or reduction.

When a two-sided setting key 1014 is pressed by a user, the control unit 605 displays a screen on the touch panel section 801. The screen allows the user to make a setting whether a single side print or a two-sided print is to be carried out in print job processing. Further, when a sheet selection key 1015 is pressed, the control unit 605 displays a screen on the touch panel section 801. The screen allows the user to set a sheet feeding section, and sheet size and sheet type (medium type) which are required in processing a print target job.

When a key 1012 is pressed, the control unit 605 displays a screen on the touch panel section 801. The screen allows a user to select image processing modes suited to an original image such as a character mode and a photograph mode. Further, a density setting key 1011 enables an adjustment to increase or decrease the density of the output image of a print target job, by a user operation.

Further, the control unit 605 performs a display for a user to check an operation state of an event that is occurring currently in the printer 105 such as standby state, in-the-middle-of-warming-up, in-the-middle-of-the-printing, jam, or an error on a status display column 1006 of the touch panel section 801. The control unit 605 displays information for allowing the user to confirm print magnification ratio of a process target job, on a display column 1007. Further, the control unit 605 causes information for allowing the user to confirm a sheet size and a sheet feed mode of a process target job, to be displayed on the display column 1016.

In addition, the control unit 605 displays on a display column 1010 information for the user to confirm a number of prints of a process target job, and information for the user to confirm a number of sheets currently being printed during a printing operation. In this manner, the control unit 605 displays various pieces of information that should be notified to the user on the touch panel section 801.

Furthermore, when an interrupt key 1013 is pressed by the user, the control unit 605 causes the printing operation of a job under printing by the printer 105 to stop, and enables execution of a printing operation of the user's job. Further, when an application mode key 1018 is pressed, the control unit 605 displays on the touch panel section 801 a screen for performing various settings including image processing and layouts such as a continuous copy of pages, a cover/interleaf setting, a reduction layout, and image shifting.

Figure 11:
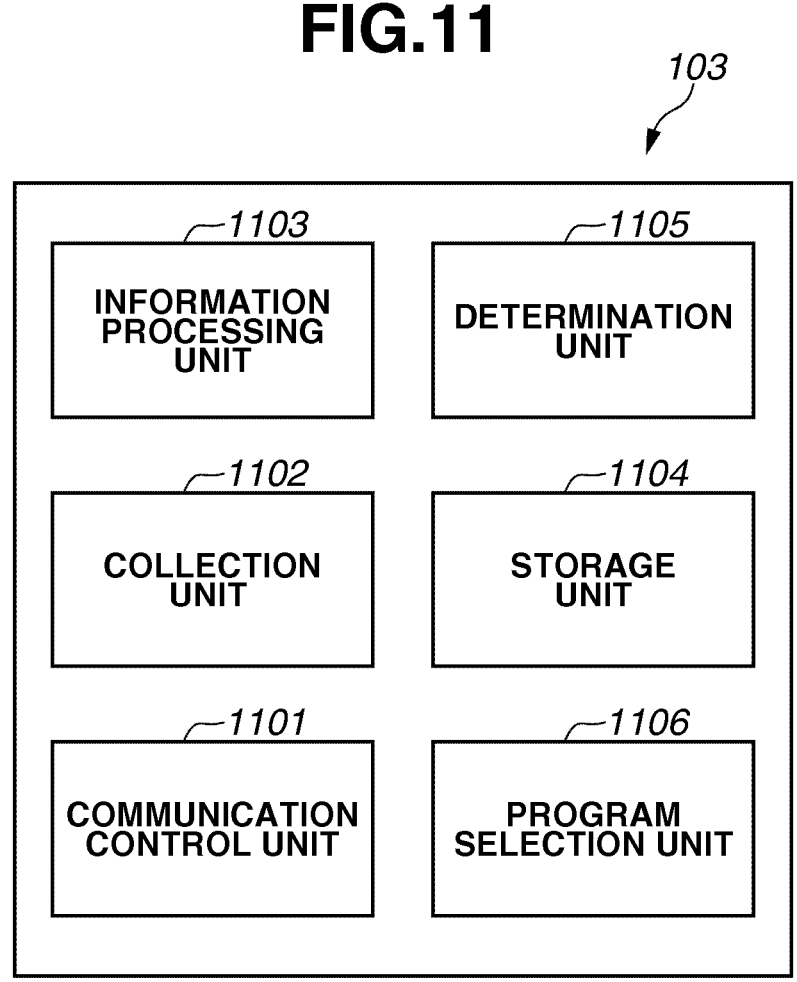
FIG. 11 is a block diagram illustrating a functional configuration of the program delivery server.

Next, functions of the program delivery server 103 that constitute the print processing system according to the exemplary embodiment will be described. FIG. 11 is a block diagram illustrating functional configuration of the program delivery server 103. The program delivery server 103 includes a communication control unit 1101, a collection unit 1102, an information processing unit 1103, a storage unit 1104, a determination unit 1105, and a program selection unit 1106.

The communication control unit 1101 controls transmission and receipt of data to and from the network 107. The communication control unit 1101 can achieve the functions with, for example, the CPU 200 and the interface 209 and the like, illustrated in FIG. 2.

The collection unit 1102 collects log information from the printer 105 via the network 107. The log information includes print job history, operation history and the like. The collection unit 1102 can achieve the function with, for example, the CPU 200 and the RAM 202 and the like illustrated in FIG. 2.

The information processing unit 1103 extracts only necessary information from the log information that the collection unit 1102 has collected, and constructs data representing features of processing in the printer 105. The information processing unit 1103 constructs data indicating actual use records of various functions of the printer 105, as the data representing the features of the processing. Various functions in the image forming apparatus include the functions illustrated in FIG. 16 and FIG. 17. In other words, necessary information refers to information representing features of collected log information.

In the data herein constructed, an imposition, a finishing setting, a color setting, a distributed printing, job monitor information, and so forth in the printer 105 are also included. The information processing unit 1103 can achieve the functions with the CPU 200 illustrated in FIG. 2 executing the program delivery program described above. The data constructed by the information processing unit 1103 is stored in the storage unit 1104.

The storage unit 1104 stores various data and programs. In particular, the storage unit 1104 stores a plurality of printer control programs appropriate for executing various printing processes. The storage unit 1104 can achieve the function with, for example, the RAM 202 and the HD 205 and the like illustrated in FIG. 2.

Furthermore, after the information processing unit 1103 has constructed data indicating actual use records of various functions of the printer 105, using the log information collected by the information processing unit 1103, the information processing unit 1103 will select at least one program from among a plurality of control programs.

The determination unit 1105 determines whether an appropriate printer control program is stored in the storage unit 1104. The appropriate printer control program is a program for executing processing which is included in the data constructed by the information processing unit 1103. Then, if the appropriate program exists, the determination unit 1105 performs notification to that effect to the management server 104. The determination unit 1105 can achieve the function with, for example, the CPU 200 illustrated in FIG. 2 executing the program delivery program described above.

The program selection unit 1106 receives user information from the management server 104, selects the printer control program, which the determination unit 1105 has determined as appropriate, from the storage unit 1104, and transmits it to the user. The program selection unit 1106 can achieve the function with, for example, the CPU 200 illustrated in FIG. 2 executing the program delivery program described above.

Figure 12:
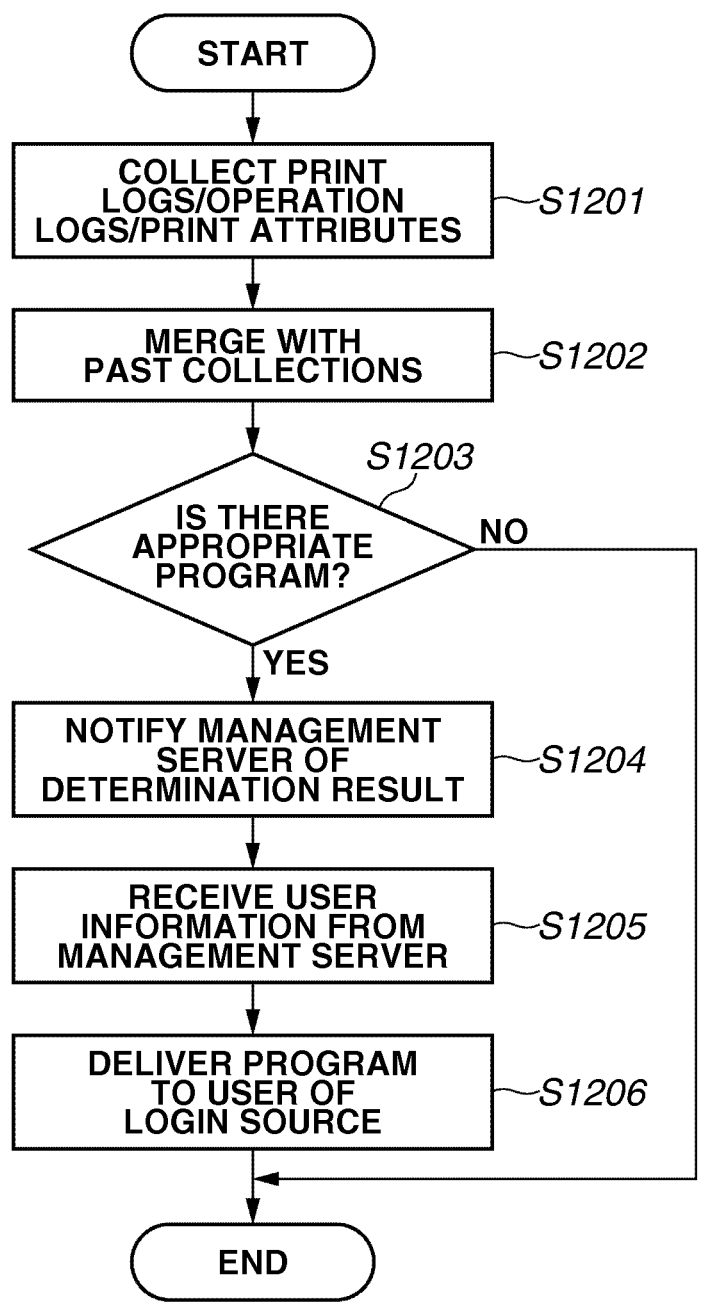
FIG. 12 is a flowchart illustrating a procedure of delivering a printer control program that the program delivery server executes.

Next, processing of the program delivery server 103 will be described. FIG. 12 is a flowchart illustrating a procedure for the printer control program delivery processing that the program delivery server 103 executes. The flowchart starts from the step at which the program delivery server 103 begins to receive the log information from the printer 105.

In the flowchart illustrated in FIG. 12, first, in step S1201, the program delivery server 103 collects log information such as a print log/an action log/a print attribute and so forth. More specifically, the collection unit 1102 in FIG. 12 collects the log information such as a print history/an action log and so forth from the printer 105 via the network 107.

FIG. 13 illustrates an example of operation history of the printer collected from the printer 105 in the processing of step S1201. In the present case, a printer operation history 1300 illustrates an example of two histories of an action log 1301 and an action log 1302. The action log 1301 indicates a state when a user switches an operation to a copy tab, and presses an editing button. Further, the action log 1302 indicates a state when the user selects a document contained in the box of the printer, and displays a preview.

FIG. 14 illustrates an example of a print history (job log) collected from the printer 105 in the processing of step S1201. A print history 1401 indicates an example including a print log 1403 when a scan is executed in the printer 105. Further, a print history 1402 indicates an example including a print log 1404, when a print is executed in the printer 105. In particular, the print history 1402 also includes a job ID 1405 associated with a print job. The print attributes during the printing operation are collected using the job ID 1405 as a key aside from the job log. FIG. 15 illustrates an example of print attributes 1500 collected by the collection unit 1102, using the job ID 1405 as a key.

Returning to FIG. 12, in step S1202, necessary information is merged with the collected data in the past. More specifically, the information processing unit 1103 extracts only necessary information from the latest log information collected in step S1201. Then, the information processing unit 1103 merges the extracted information with past information stored in the storage unit 1104, and creates data (table for log storage) describing only necessary information. The table for log storage created here is information focusing on the specific user. The table for log storage draws up a list of print/printer operation history information that the user performed in the past. The table for log storage is stored in the storage unit 1104.

FIG. 16 illustrates an example of the table for log storage. In the table for log storage 1600, collected action logs, job logs, print attributes are simplified, and each piece of information is described on category basis. For example, data 1601 is one of data that the table for log storage 1600 retains. The data 1601 indicates information that a user <TARO> performed imposition/finishing settings on a job of "original 1", and displayed a preview. The table for log storage 1600 is used in step S1203.

Next, in step S1203, it is determined whether there is an appropriate program. More specifically, the determination unit 1105 in FIG. 11 determines presence or absence of an appropriate program according to the log information described in the table for log storage 1600 created in step S1202.

FIG. 17 illustrates an example of a program registration table that registers features of the printer control program. In step S1203, the information processing unit 1103 creates a log table for determination based on the table log storage 1600 in FIG. 16. Then, the determination unit 1105 determines whether there is an appropriate printer control program in the program registration table 1700 illustrated in FIG. 17, based on the log table (the detail is described below). In the program registration table 1700, settings in which weights are assigned on category basis to features of the printer control program (application) stored in the storage unit 1104, are registered in a list. For example, if a table 1701 is taken as an example, a program APRI1 is a program for performing an imposition, and weights are assigned to job setting change of category 2 which indicates the features (for example, perform detailed imposition while watching a preview). The program registration table 1700 is stored in advance in the storage unit 1104.

In step S1203, if there is no appropriate program (NO in step S1203), the processing ends. On the other hand, instep S1203, if there is an appropriate program (YES in step S1203), the determination unit 1105 notifies the management server 104 of a determination result in step S1204. More specifically, the determination unit 1105 notifies the management server 104, which manages user information, via the communication control unit 1101 that the corresponding program exists. The management server 104, which received the determination result, enters a standby state waiting to detect the user's login, in order to prompt to deliver the printer control program that corresponds to the determination result, to a user's client apparatus 101. After that, if the management server 104 detects the login from the user, the processing proceeds to step S1205.

Next, in step S1205, the user information is received from the management server. The management server 104, when detecting the user's log information, transmits information of the client apparatus 101 that the user uses (user information) and the management server 104 manages, to the program delivery server 103. Then, the program selection unit 1106 of the program delivery server 103 receives the user information via the communication control unit 1101.

Finally, in step S1206, the program is delivered to the user of login destination. More specifically, the program selection unit 1106 selects the printer control program that the determination unit 1105 has determined as appropriate from the storage unit 1104, and transmits it to the client apparatus 101 that the user uses.

Next, a program appropriateness determination processing in step S1203 of FIG. 12 will be described. FIG. 18 is a flowchart illustrating a procedure for the program appropriateness determination processing in step S1203 of FIG. 12. All the processing as described below is executed by the determination unit 1105 in FIG. 11. Hereinbelow, different selection processing is performed depending on whether printing is carried out in a print job via the network, or printing is carried out in an operation via the operation unit of the image forming apparatus.

In the flowchart in FIG. 18, first, in step S1801, it is determined whether collected information contains both action log and job log.

In step S1801, if the collected information contains only a job log (ONLY JOB LOG in step S1801), it is determined that the collected information is information of the print job in step S1802. Then, in step S1803, the determination unit 1105 reads out log information of only category 1 from the user's log of the collected information and the user's log information retained in the log storage table1 600, and creates a log table for determination. After that, the processing proceeds to step S1808.

In step S1801, if both the job log and the action log exist in the collected information (BOTH EXIST in step S1801), it is determined as information of a job in which print output was performed from UI of the printer in step S1804. Then, in step S1804, the determination unit 1105 reads out log information of categories 1 to 4 from the user's log of the collected information and the user's log information retained in the log storage table 1600, and creates the log table for determination. After that, the processing proceeds to step S1808.

In step S1801, if the collected information contains only action log (ONLY ACTION LOG in step S1801), it is determined that the collected information is information of a print job in step S1806. Then, in step S1807, the determination unit 1105 reads out log information categories 3 to 5 from the user's log of the collected information and the user's log information retained in the log storage table 1600, and creates the log table for determination. Hereafter, the processing proceeds to step S1808.

Then, in step S1808, weighting criteria are set with respect to the log tables each created in step S1803, 1805, and 1807, referring to the program registration table 1700.

Next, in step S180, it is determined whether there is an appropriate program. More specifically, the determination unit 1105 determines whether an appropriate program exists among programs registered in a program registration table 1700, in accordance with the weighting criteria set in the processing of step S1808. In this process, if it is determined that there is not an appropriate program (NO in step S1809), the processing ends.

On the other hand, in step S1809, if it is determined that there is an appropriate program (YES in step S1809), then in step S1810, the determination unit 1105 determines whether there are more logs than specified. In this process, based on a result that it has been determined that there is an appropriate program from the specific user's log information, it is determined whether the user's log information exists in more amount than specified. A specified number that is a criterion is to be set in advance. If more log information than specified does not exist (NO in step S1810), the processing ends.

On the other hand, in step S1810, if more log information than specified exists (YES in step S1810), then in step S1811, the determination unit 1105 notifies the management server 104 of the determination result. In this process, the determination unit 1105 notifies that the appropriate program exists as a result of determination processing from the log information.

As described above, according to the present exemplary embodiment, the determination unit 1105 can identify the client apparatus 101 that the user corresponding to the log information uses, from the log information in the printer 105. Then, a program that enables control of the printer 105 remote from the client apparatus 101, is delivered to the client apparatus 101 that the user uses while the control of the printer 105 is normally performed by directly operating the printer 105. Consequently, it becomes possible to perform the control of the printer 105, which could be performed only by directly operating the printer 105, from the client apparatus 101 that the user uses. In addition, it becomes possible to perform the control of the printer 105, which agrees with the user's desire, with good efficiency from the user's client apparatus 101 which is located at a remote place. Further, a specific user does not solely possess one printer 105, but a plurality of users can efficiently utilize one printer 105.

The program delivery method described in the exemplary embodiment can be realized by executing a program prepared in advance by a computer such as a personal computer or a workstation. The program is recorded in computer-readable recording medium including a hard disk, and executed by reading out from the recording medium by a computer. Further, the program may be a medium that can be received via the network.

According to the exemplary embodiment, from log information of an image forming apparatus, a client apparatus used by a user corresponding to the log information can be identified. A program which is normally executed by directly operating the image forming apparatus, enables control of the image forming apparatus remote from the client apparatus, and is delivered to the client apparatus that the user uses. Thereby, the control of the image forming apparatus, which could be performed only by directly operating the image forming apparatus, can be performed from the client apparatus that the user uses. In addition, the control of image forming apparatus, which agrees with the user's desire, can be performed from the client apparatus located at a remote place. Further, a specific user does not solely possess one image forming apparatus, but one image forming apparatus can be efficiently utilized by a plurality of users.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-006134 filed Jan. 14, 2009, which is hereby incorporated by reference herein in its entirety.

What is claimed is:

1. A program delivery server comprising:
a collection unit configured to collect log information including actual use records of functions of an image forming apparatus, via a network;
a storage unit configured to store a table for managing operations performed by a specific user at the image forming apparatus for each of a plurality of categories, based on log information of the specific user of the log information collected by the collection unit;
a selection unit configured to select at least one control program corresponding to a category of an operation performed by the specific user at the image forming apparatus, from among a plurality of control programs, based on the table stored by the storage unit;
a determination unit configured to determine whether the stored table includes more than a specified number of logs for operations performed by the specific user; and
a transmission unit configured to transmit the control program selected by the selection unit to a client apparatus that the specific user uses in a case where the stored table is determined by the determination unit to include more than the specified number of logs for operations performed by the specific user,
wherein the control program selected by the selection unit is a program that enables the operation performed by the specific user at the image forming apparatus to be done remotely from the client apparatus.

2. The program delivery server according to claim 1, wherein the plurality of categories include a first category containing at least one of an imposition, a finishing setting, a color setting and a second category containing job monitor information in the image forming apparatus.

3. The program delivery server according to claim 1, wherein the log information includes a print log and an action log.

4. A program delivery method comprising:
collecting log information including actual use records of functions of an image forming apparatus via network;
storing a table for managing operations performed by a specific user at the image forming apparatus for each of a plurality of categories, based on log information of the specific user of the log information collected by the collection unit;
selecting at least one control program corresponding to a category of an operation performed by the specific user at the image forming apparatus from among a plurality of control programs, based on the table stored;
determining whether the stored table includes more than a specified number of logs for operations performed by the specific user; and
transmitting the selected control program to a client apparatus that the specific user uses in a case where the stored table is determined to include more than the specified number of logs for operations performed by the specific user,
wherein the control program selected is a program that enables the operation performed by the specific user at the image forming apparatus to be done remotely from the client apparatus.

5. The program delivery method according to claim 4, wherein the plurality of categories include a first category containing at least one of an imposition, a finishing setting, a color setting and, a secondary category containing job monitor information in the image forming apparatus.

6. The program delivery method according to claim 4, wherein the log information includes a print log and an action log.

7. A non-transitory computer-readable storage medium that stores a control program for causing a computer to execute a program delivery method, the program delivery method comprising:
collecting log information including actual use records of functions of an image forming apparatus via network;
storing a table for managing operations performed by a specific user at the image forming apparatus for each of a plurality of categories, based on log information of the specific user of the log information collected by the collection unit;
selecting at least one control program corresponding to a category of an operation performed by the specific user at the image forming apparatus from among a plurality of control programs, based on the table stored;
determining whether the stored table includes more than a specified number of logs for operations performed by the specific user; and
transmitting the selected control program to a client apparatus that the specific user uses in a case where the stored table is determined to include more than the specified number of logs for operations performed by the specific user,
wherein the control program selected is a program that enables the operation performed by the specific user at the image forming apparatus to be done remotely from the client apparatus.

8. The computer-readable storage medium according to claim 7, wherein the log information includes a print log and an action log.

* * * * *